(12) United States Patent
Okorogu

(10) Patent No.: US 6,597,476 B1
(45) Date of Patent: Jul. 22, 2003

(54) COMMON APERTURE HOLOGRAPHIC OPTICAL ELEMENT DEVICES FOR A FREE SPACE OPTICAL TRANSCEIVER

(75) Inventor: Albert O. Okorogu, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/852,825

(22) Filed: May 9, 2001

(51) Int. Cl.[7] .................................................. G02B 5/32
(52) U.S. Cl. .......................................... 359/15; 359/152
(58) Field of Search ................................ 359/15, 1, 130, 359/159, 152, 153; 250/216, 237 R, 236 G; 356/457; 369/103, 112.1, 275.1

(56) References Cited

U.S. PATENT DOCUMENTS 5,255,065 A * 10/1993 Schwemmer ................. 356/5
5,706,114 A * 1/1998 Erteza ........................ 359/159
6,498,662 B1 * 12/2002 Schuster ...................... 359/15

* cited by examiner

Primary Examiner—Mark A. Robinson
Assistant Examiner—Alessandro Amari
(74) Attorney, Agent, or Firm—Blakely Sokoloff Taylor & Zafman, LLP

(57) ABSTRACT

A free space optical transceiver includes a first holographic optical element (HOE) device having a first recorded interference pattern to diffract a received light signal into a plurality of orders. A second HOE device has a second recorded interference pattern and is positioned relative to the first HOE device to reflect the orders of the diffracted light signal towards corresponding optical components. Use of the reflected orders in this manner in conjunction with the optical components provides the transceiver with multiple functionalities, such as communication, tracking, and alignment. Also, the first and second HOE devices have their interference patterns recorded on an emulsion material that is shaped to provide a common aperture through which to pass a transmitted light signal, thereby adding to the overall compactness of the transceiver.

28 Claims, 2 Drawing Sheets

COMMON APERTURE HOLOGRAPHIC OPTICAL ELEMENT DEVICES FOR A FREE SPACE OPTICAL TRANSCEIVER

TECHNICAL FIELD

This disclosure relates generally to wireless communication systems, and in particular but not exclusively, relates to the use of a common aperture holographic optical element (HOE) devices for a free space optical transceiver.

BACKGROUND

At a basic level, a typical wireless optical telecommunication system comprises an optical transmitter and an optical receiver, with associated electronics to modulate and demodulate data on a light beam.

These optical transmitter and receiver units may have many parts, thereby contributing to the overall size or "footprint" of the units. The individual parts themselves may also have a large footprint. This increased footprint can be detrimental in situations where the units need to be installed in a non-obtrusive manner. The increased footprint can also disadvantageously limit the amount of available space, within the housing of the transmitter or receiver units, in which to fit the various parts or components.

In an effort to reduce the overall footprint of these components, optical transmitters and optical receivers are sometimes combined together into optical "transceivers." However, despite some potential gain in compartmentalization as a result of this combination, other components nevertheless often need to be included with the optical transceiver in order to provide the optical transceiver with additional functionalities. Adding these other components for each type of functionality increases the overall complexity, costs, fragility, footprint and bulkiness of the transceiver. The components themselves, as well as the transceiver, are difficult to manufacture with consistent quality. Because optical communications systems are capable of much higher data rates than traditional radio frequency (RF) systems, stable and inexpensive transceivers that provide multiple-features are needed.

SUMMARY OF THE INVENTION

According to an aspect of the invention, an apparatus includes a first holographic optical element (HOE) device having a first recorded interference pattern to diffract a received light signal into a plurality of orders. A second HOE device has a second recorded interference pattern and is positioned relative to the first HOE device to reflect the orders of the diffracted light signal towards corresponding optical components. The first and second HOE devices have their interference patterns recorded on an emulsion material that is shaped to provide a common aperture through which to pass a transmitted light signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a free space optical transceiver that uses common aperture holographic optical element (HOE) devices are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention improves the compartmentalization of a wireless optical transceiver. A compact, multi-functional, common aperture transceiver is provided, which can lead to far broader applications. In an embodiment of the common aperture transceiver, holographic optical element (HOE) devices are used as optical elements. Tuning one of the HOE devices' diffracted energy into higher orders enables the application of a single optical element in the execution of a multi-purpose task. This reduces the transceiver's complexity, because for instance, the first order diffracted light signal (e.g., light beam) can be used for photon collection, the second order diffracted light signal for tracking, the third order diffracted light signal for alignment, and so on.

Figure 1:
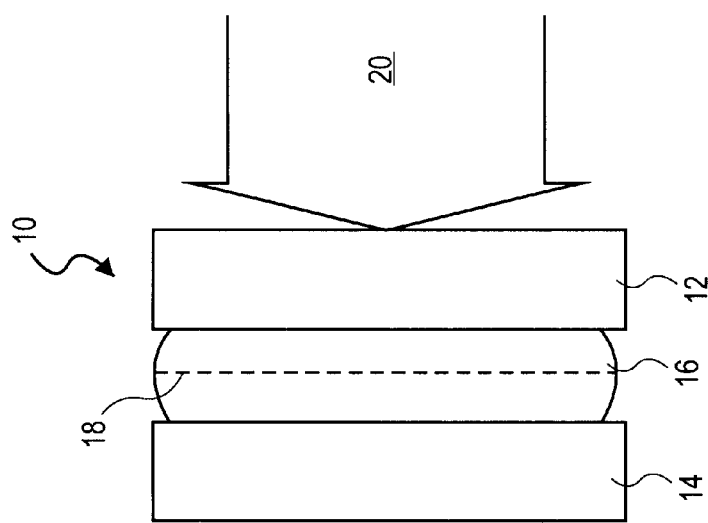
FIG. 1 is a side sectional view of a holographic optical element (HOE) device in accordance with an embodiment of the invention.

Referring first to FIG. 1, shown generally at 10 is a side sectional view of a first HOE device in accordance with an embodiment of the invention. The first HOE device 10 comprises a first element 12 and a second element 14 (made of glass, for example) that "sandwich" an emulsion material 16. The emulsion material 16 has a first interference pattern 18 recorded thereon.

In an embodiment, the first interference pattern 18 comprises a volume phase hologram that is recorded on the emulsion material 16. In operation during playback, the first interference pattern 18 diffracts a received light signal 20, such that the diffracted light signal converges towards a point. Portions of the first interference pattern 18 may be thought of as being similar to a diffraction grating.

Examples of techniques that can be used to record the first interference pattern 18, using interfering light rays, are disclosed in U.S. patent application Ser. No. 09/627,815, entitled "SYSTEM AND METHOD FOR USING A HOLOGRAPHIC OPTICAL ELEMENT IN A WIRELESS TELECOMMUNICATION SYSTEM RECEIVER," filed Jul. 28, 2000, and in U.S. patent application Ser. No. 09/627,816, entitled "APPARATUS AND METHOD FOR CORRECTING ABERRATIONS IN PHOTON COLLECTION DEVICES," filed Jul. 28, 2000. Both of these patent applications further disclose suitable materials/mixtures that can be used for the first element 12, the second element 14, and the emulsion material 16. These patent applications are assigned to the same assignee as the present application, and are incorporated herein by reference in their entirety.

Figure 2:
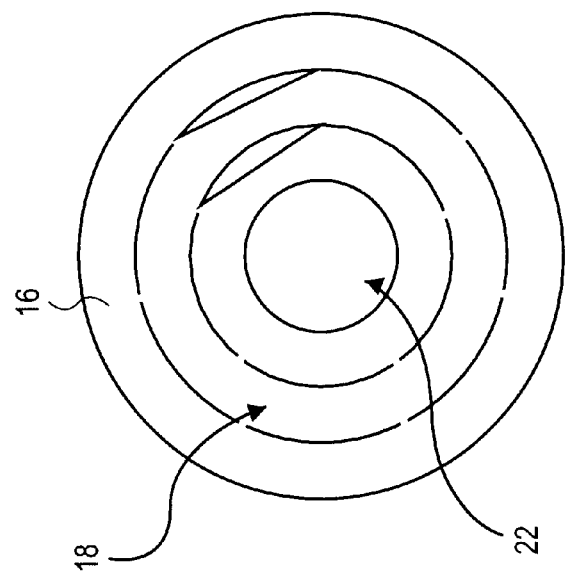
FIG. 2 is a front view of the HOE device of FIG. 1.

FIG. 2 is a front view of the first HOE device 10 of FIG. 1, showing an example shape of the emulsion material 16. The emulsion material 16 may have a substantially circular shape, and it is to be appreciated that it may have other shapes as well, such as elliptical. Due to the process used to record the first interference pattern 18, an obscuration forms in the central region of the emulsion material 16. This central region of the emulsion material 16 may be removed to form an aperture 22. As will be described below with reference to FIG. 3, the aperture 22 can be a "common" aperture with an aperture of a second HOE device 26, such that a transmitted light signal 28 can pass through the common aperture.

Due to inherent imperfections in the recording process for the first interference pattern 18 and other inherent imperfections in the fabrication process for the HOE device 10, the first interference pattern 18 will diffract the received light signal 20 into a plurality of diffraction orders. Thus, the energy of the 0th order is transformed or otherwise transferred to the first order, second order, and so on. In an embodiment, the first order (which is itself a light signal) can be directed to a communication detector, since the first order typically will have the greatest energy in many (but not necessarily all) cases. The other higher orders can be used for other purposes, such as tracking and alignment.

Figure 3:
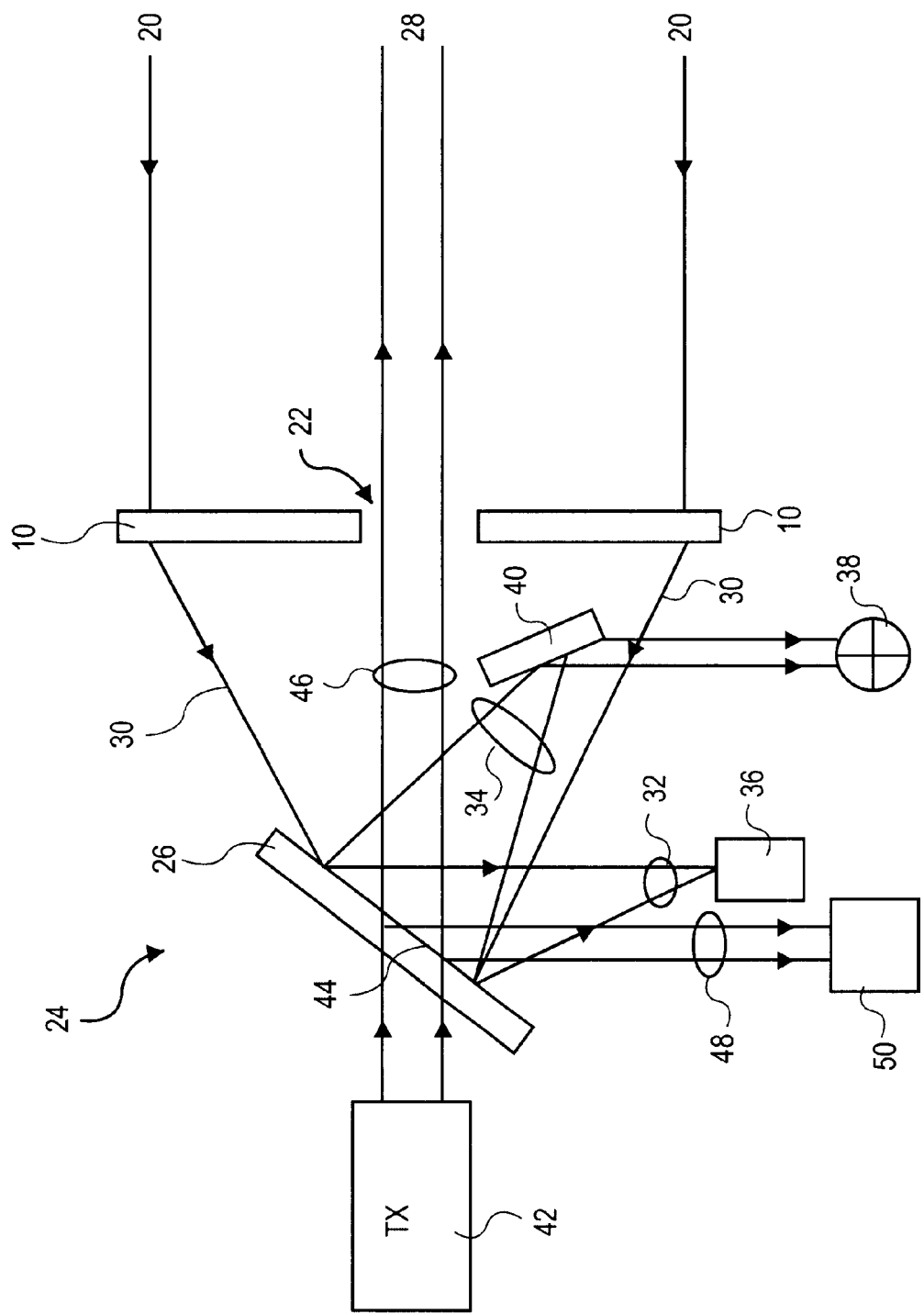
FIG. 3 is a schematic block diagram of an embodiment of a free space optical transceiver that uses the HOE device of FIGS. 1–2 and another HOE device.

FIG. 3 is a schematic block diagram of a free space optical transceiver 24 that uses the HOE device 10 of FIGS. 1–2 and another HOE device 26. The transceiver 24 is capable to receive the light signal 20 and to transmit the light signal 28. According to an embodiment, the light signals 20 and 28 can comprise laser light and the like, having data modulated thereon at a 1.25 Gbps data rate, for instance. Example wavelengths can be 1548.51 nm for the received light signal 20 and 1625 nm for the transmitted light signal 28. The light signals 20 and 28 are not limited to being monochromatic or to any particular wavelength or color, and may include visible light as well as ultraviolet or infrared portions of the spectrum.

In an embodiment, the second HOE device 26 can be structured similarly to the first HOE device 10 of FIG. 1. That is, the second HOE device can comprise an emulsion material sandwiched between two glass or plastic elements, with a second interference pattern recorded on the emulsion material of the second HOE device 26. In contrast to the first interference pattern 18 that diffracts the received light signal 20, however, the second interference pattern of the second HOE device 26 reflects the orders diffracted from the first HOE device 10 (e.g., the second HOE device 26 is a reflective HOE device). Thus in FIG. 3, the diffracted light signal (including its multiple orders) are shown symbolically at 30. The first and second order light signals reflected from the second HOE device 26 are shown symbolically at 32 and 34, respectively.

In some instances, the diffracted light signal 30 has minimal separation between its multiple orders as the diffracted light signal 30 leaves the first interference pattern 18. Accordingly, the second interference pattern of the second HOE device 26 can be fabricated in such a way that adequate separation is provided between the orders (e.g., the first order light signal 32 and the second order light signal 34) when the orders are reflected from the second interference pattern. To obtain this separation capability, a grating can be recorded as part of the second interference pattern such that elements of the grating reflect the first order light signal 32 and the second order light signal 34 in different directions that are sufficiently separated. This can be thought of as "tuning" the second HOE device 26. A person skilled in the art would be familiar with reflective HOE recording techniques to separate and reflect orders of a light signal, or to otherwise tune the second HOE device 26, based on the description of embodiments of the invention provided herein.

The second HOE device 26 is positioned relative to the first HOE device 10 to reflect the orders 32 and 34 of the diffracted light signal 30 towards corresponding optical components. The optical components can be used to obtain information related to the received light signal 20. For instance, one of the orders of the diffracted light signal 30 (such as the first order light signal 32) can be reflected from the second HOE device 26 towards an optical component comprising a communication detector 36. In an embodiment, the communication detector 36 can include a photosensitive device for photon collection, such as a photodiode, avalanche photodiode, charge coupled device, PIN detector, phototransistor, InGaAs detector, and the like, which can be used in conjunction with obtaining the data modulated on the received light signal 20.

Another optical component to receive one of the orders (such as the second order light signal 34) reflected from the second HOE device 26 can include a tracking detector. An example of a tracking detector that can be used in an embodiment is a "quad cell" detector 38. For added compactness and to reduce focal length, a mirror 40 (such as a 100% mirror) can be positioned between the second HOE device 26 and the quad cell detector 38. The mirror 40 directs the second order light signal 34 from the second HOE device 26 to the quad cell detector 38.

It is to be appreciated that use of these orders 32 and 34 as described above are illustrative. They may be used for other purposes in other embodiments. Furthermore, additional orders of the diffracted light signal 30 may be present, and such orders may be used for photon collection, tracking, alignment, or other purposes.

An embodiment of the transceiver 24 includes a transmitter 42 (such as a laser including its associated lenses, optical fiber, and other optics) to transmit the light signal 28. The transmitter 42 can be positioned adjacent to the second HOE device 26. In an embodiment, the emulsion material of the second HOE device 26 is shaped with a clear or cut central aperture, similar to the aperture 22 of the first HOE device 10.

The aperture of the second HOE device 26 can be aligned on-axis with the aperture 22 of the first HOE device 10, thereby allowing the transmitter 42 to transmit the light signal 28 straight through the common aperture (e.g., through the aperture of the second HOE device 26 and through the aperture 22 of the first HOE device 10). In another embodiment, the transmitted light signal 28 can be "folded" by a mirror(s) (not shown) after it passes through the second HOE device 26 and before passing through the aperture 22 of the first HOE device 10. This mirror may be used to add compactness if needed, and at the same time, the transmitted light signal 28 still passes through a common aperture of the HOE devices 10 and 26.

In an embodiment, the transceiver 24 includes a beam splitter 44 to split the transmitted light signal 28 into a first potion 46 and into a second portion 48. The beam splitter 44 is positioned to direct the first portion 46 through the common apertures of the second HOE device 26 and of the first HOE device 10. The beam splitter 44 is positioned to direct the second portion 48 to an optical circuit 50.

In an embodiment, the beam splitter 44 can be positioned within the aperture of the second HOE device 26 for added compactness. The beam splitter 44 can comprise, for example, a 90–10 beam splitter such that 90% (e.g., the first portion 46) is used for transmission, while the remaining 10% (e.g., the second portion 48) is used for other purposes by the optical circuit 50. For instance, the optical circuit 50 can comprise a phase error correction circuit that uses adaptive optics. As another implementation, the optical circuit 50 can include a scintillation sensor circuit. With this scintillation sensor circuit, the second portion 48 can be compared with the diffracted light signal 30 to detect the effects of fog, heat, air pressure, or other environmental conditions that may affect transmission and reception of light signals.

In conclusion, the transceiver 24 provides a system that is compact. The transceiver 24 uses the first HOE device 10 and the second HOE device 26 as the optical elements for photon collection. Use of the multiple orders of the diffracted light signal 30 for different purposes provides the transceiver 24 with multiple functions, in contrast to other systems where such orders may be ignored or unused. Because the transceiver 24 uses these orders, uses a common aperture for the transmitted light signal 28, and includes components such as the mirror 40 and the beam splitter 44, characteristics such as compactness, reliability, durability, efficiency, ease of fabrication, and cost savings are obtained.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, the first order light signal 32 has been described herein as being directed to the communication detector 36, while the second order light signal 34 is directed to the quad cell detector 38. It is to be appreciated that these orders need not be directed to these specific optical components in other embodiments. For instance, the second order light signal 34 may have more energy than the first order light signal 32 in another embodiment, and so can be directed to the communication detector 36. In another embodiment, the various orders can be directed to optical components alternative or in addition to the communication detector 36 and to the quad cell detector 38. In yet another modification, use of the second HOE device 26 may be eliminated if sufficient separation can be obtained between the orders of the diffracted light signal 30 as it leaves the interference pattern 18.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a first holographic optical element (HOE) device to diffract a received light signal into a plurality of orders, the first HOE device having an aperture therein; and
    a second HOE device to direct the orders of the diffracted light signal to corresponding optical components, the second HOE device having an aperture therein.

2. The apparatus of claim 1 wherein the second HOE device comprises a reflective HOE device to separate and reflect the orders of the diffracted light signal.

3. The apparatus of claim 1, further comprising a transmitter to transmit another light signal through the apertures of the first and second HOE devices.

4. The apparatus of claim 3, further comprising a beam splitter to direct a first portion of the light signal transmitted from the transmitter through the apertures of the first and second HOE devices, and to direct a second portion of that light signal to an optical circuit.

5. A system, comprising:
    a first holographic optical element (HOE) device to diffract a received light signal into a plurality of orders, the first HOE device being shaped to provide a first aperture;
    a second HOE device to reflect the orders of the diffracted light signal to corresponding optical components, the second HOE device being shaped to provide a second aperture; and
    a transmitter to transmit another light signal through the first and second apertures.

6. The system of claim 5 wherein the second HOE device includes:
    an emulsion material disposed between first and second elements; and
    an interference pattern recorded on the emulsion material, the recorded interference pattern being capable to reflect with separation the orders of the diffracted light signal received from the first HOE device.

7. The system of claim 5, further comprising a beam splitter positioned adjacent to the second aperture of the second HOE device, the beam splitter capable to direct a first portion of the transmitted light signal towards the first aperture of the first HOE device, the beam splitter capable to direct a second portion of the transmitted light signal to an optical circuit.

8. A method, comprising:
    diffracting a received light signal into a plurality of orders using a first HOE device having an aperture therein;
    separating the plurality of orders and directing at least some of the plurality of orders towards corresponding optical components using a second HOE device having an aperture therein; and
    using the optical components to obtain, from the at least some of the plurality of orders, information related to the received light signal.

9. The method of claim 5, further comprising transmitting another light signal through the apertures of the first and second HOE devices in addition to receiving the received light signal.

10. The system claim 8 wherein separating the plurality of orders and directing at least some of the plurality of orders towards corresponding optical components includes using a reflective holographic optical element to separate and direct the orders.

11. The method of claim 9, further comprising:
    splitting the transmitted light signal into a plurality of portions;
    directing one of the portions of the transmitted light signal through the common aperture; and
    directing at least another one of the portions of the transmitted light signal towards a corresponding optical circuit.

12. An apparatus, comprising:

a first holographic optical element (HOE) device having a first recorded interference pattern to diffract a received light signal into a plurality of orders;

a second HOE device having a second recorded interference pattern and positioned relative to the first HOE device to reflect the orders of the diffracted light signal towards corresponding optical components, the first and second HOE devices having their interference patterns recorded on emulsion materials that are shaped to provide a common aperture through which to pass a transmitted light signal; and a beam splitter to split the transmitted light signal into a first portion and into a second portion, the beam splitter positioned to direct the first portion of the transmitted light signal through the common apertures of the first and second HOE devices, the beam splitter positioned to direct the second portion of the transmitted light signal to an optical circuit.

13. The apparatus of claim 12 wherein one of the optical components comprises a communication detector to receive one of the orders of the diffracted light signal reflected from the second HOE device.

14. The apparatus of claim 12 wherein one of the optical components comprises a tracking detector to receive one of the orders of the diffracted light signal reflected from the second HOE device.

15. The apparatus of claim 12, further comprising a transmitter positioned adjacent to the second HOE device to transmit the transmitted light signal through the aperture shaped in the emulsion material of the second HOE device.

16. The apparatus of claim 12 wherein the second recorded interference pattern of the second HOE device comprises a grating that is recorded to provide separation between the orders of the diffracted light signal reflected therefrom.

17. The apparatus of claim 12 wherein the optical circuit comprises a phase error correction circuit or a scintillation sensor circuit.

18. The apparatus of claim 12 wherein the beam splitter is positioned within the aperture of the second HOE device.

19. The apparatus of claim 14, further comprising a mirror positioned between the second HOE device and the tracking detector to direct that order from the second HOE device to the tracking detector.

20. An apparatus, comprising:

a first holographic optical element (HOE) having an optical aperture therein and a first recorded interference pattern to diffract a received light signal into a plurality of orders; and a second HOE having an optical aperture therein and a second recorded interference pattern, the second HOE being positioned relative to the first HOE device to reflect the orders of the diffracted light signal towards corresponding optical components and to provide a common aperture through which to pass a transmitted light signal.

21. The apparatus of claim 20 wherein one of the optical components comprises a communication detector to receive one of the orders of the diffracted light signal reflected from the second HOE device.

22. The apparatus of claim 20 wherein one of the optical components comprises a tracking detector to receive one of the orders of the diffracted light signal reflected from the second HOE device.

23. The apparatus of claim 20, further comprising a transmitter positioned adjacent to the second HOE device to transmit the transmitted light signal through the aperture shaped in the emulsion material of the second HOE device.

24. The apparatus of claim 20 wherein the second recorded interference pattern of the second HOE device comprises a grating that is recorded to provide separation between the orders of the diffracted light signal reflected therefrom.

25. The apparatus of claim 20, further comprising a beam splitter to split the transmitted light signal into a first portion and into a second portion, the beam splitter positioned to direct the first portion of the transmitted light signal through the apertures of the first and second HOE devices, the beam splitter positioned to direct the second portion of the transmitted light signal to an optical circuit.

26. The apparatus of claim 22, further comprising a mirror positioned between the second HOE device and the tracking detector to direct that order from the second HOE device to the tracking detector.

27. The apparatus of claim 25 wherein the optical circuit comprises a phase error correction circuit or a scintillation sensor circuit.

28. The apparatus of claim 25 wherein the beam splitter is positioned within the aperture of the second HOE device.

* * * * *

UNITED STATES PATENT AND TRADEMARK OFFICE
CERTIFICATE OF CORRECTION

PATENT NO.   : 6,597,476 B1
DATED        : July 22, 2003
INVENTOR(S)  : Okorogu

It is certified that error appears in the above-identified patent and that said Letters Patent is hereby corrected as shown below:

<u>Column 6,</u>
Line 51, please delete "claim 5" and insert -- claim 8 --.

Signed and Sealed this

Fourth Day of May, 2004

JON W. DUDAS
*Acting Director of the United States Patent and Trademark Office*